March 12, 1957 J. W. GRAY ET AL 2,784,908
ELECTRICAL NAVIGATION APPARATUS
Filed June 7, 1945
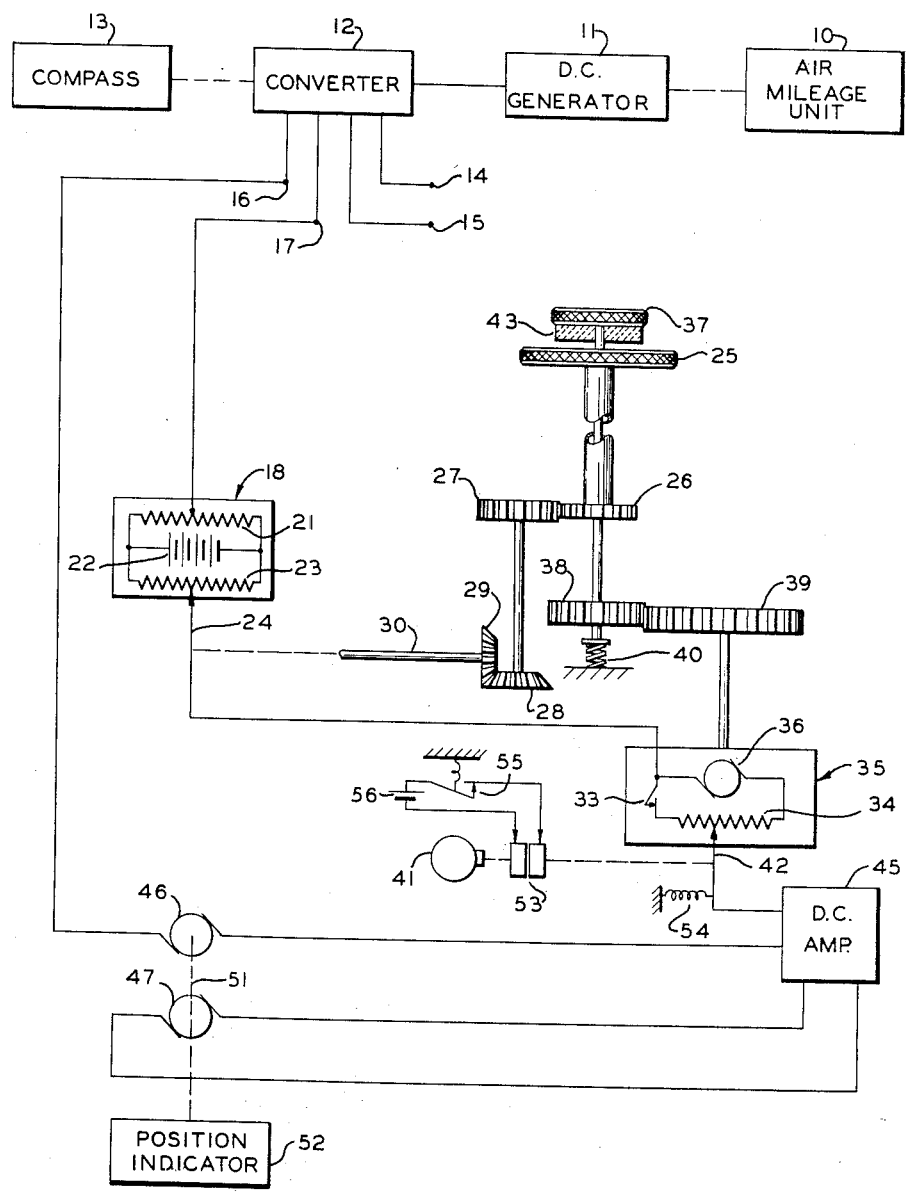
JOHN W. GRAY
WILLIAM D. GREEN JR.
DAVID SAYRE
*INVENTORS.*
BY
William D. Hall
ATTORNEY

United States Patent Office 2,784,908
Patented Mar. 12, 1957

2,784,908

ELECTRICAL NAVIGATION APPARATUS

John W. Gray, Cambridge, and William D. Green, Jr., and David Sayre, Boston, Mass., assignors, by mesne assignments, to the United States of America as represented by the Secretary of War Application June 7, 1945, Serial No. 598,160

2 Claims. (Cl. 235—61)

This invention relates in general to electrical apparatus and more particularly to an aided tracking system for use in a navigational system.

One method of navigating an aircraft is by a process of dead reckoning in which the courses of the aircraft through the air mass are integrated with the direction and velocity of the wind to give the position of the aircraft relative to the ground. In such a system of navigation, it is obvious that the velocity and direction of the wind velocity relative to the ground must be known.

Radio object detection apparatus may be carried by the aircraft to aid in navigation. Such apparatus can be arranged to display the general features of the terrain under the aircraft so that the actual movement of the aircraft with respect to the earth over short courses may be plotted. Thus, the accuracy of the dead reckoning can be checked and necessary corrections made for errors in the assumptions of wind velocity and direction.

It is an object of this invention to provide a device wherein adjustment as to position corrects an adjustment as to rate. It is another object of this invention to provide a system for producing an accurate indication of the travel of an aircraft with respect to ground. It is another object of this invention to provide a means whereby corrections may be made to an assumption of wind velocity and direction.

It is also an object of this invention to provide a means whereby the indicated position of the aircraft with respect to ground may be corrected at any time said correction also affecting the proper correction to the assumption of wind velocity and direction.

Other objects, features, and advantages of this invention will suggest themselves to those skilled in the art and will become apparent from the following description of the invention taken in connection with the accompanying drawing in which:

Fig. 1 is a schematic diagram embodying the principles of this invention.

Referring now more particularly to Fig. 1, the air mileage unit 10 is a device for producing a shaft rotation proportional to the speed of the aircraft with respect to the air mass through which it flies. This device may include an air screw, Pitot tube, or Venturi tube, and may include means for correction for air density. Air mileage unit 10 is mechanically connected to generator 11, the voltage output of which is proportional to its speed of rotation.

The voltage produced by generator 11 is applied to converter 12. Converter 12 is also supplied an indication of the compass heading of the aircraft from compass 13. Converter 12 may be any device capable of converting indications of airspeed and aircraft direction into indications of airspeed along two rectangular coordinates. Converter 12 may be a potentiometer having a plurality of contacts and being so wound as to offer effectively two resistances varying as the sine and cosine of the aircraft heading. The voltage from generator 11 applied to said resistances will produce voltages proportional to airspeed along the two coordinates. Such a potentiometer is disclosed in the application by Edward F. Mac-Nichol, Jr., Serial No. 598,158, entitled "Electrical Apparatus," filed June 7, 1945. Another apparatus for achieving this result is disclosed in the application by Britton Chance, Serial No. 598,165, entitled "Electrical Apparatus," filed June 7, 1945.

A voltage proportional to airspeed along one coordinate (for example in a north-south direction) will appear across terminals 16 and 17. A voltage proportional to airspeed along the other coordinate (for example in an east-west direction) will appear across terminals 14 and 15.

In series with contact 17 is wind circuit 18. This circuit includes a center tapped resistor 21 in parallel with battery 22 and potentiometer 23. The resistor of potentiometer 23 is tapped by contactor 24, the position of which is determined by adjustable knob 25 acting through spur gears 26 and 27, bevel gears 28 and 29 and shaft 30. Contactor 24 is connected to one end of the resistor of potentiometer 34 by switch 33 in position circuit 35. Potentiometer 34 is connected across D.-C. generator 36, in series with switch 33. Generator 36 is rotated by knob 37 acting through spur gears 38 and 39.

Knob 37 may be moved axially by positioning it against spring 40 so that friction material 43 mounted on the underside of knob 37 grips knob 25; thus causing knobs 25 and 37 to be turned in unison. Motor 41 operates through magnetic clutch 53 to drive contactor 42 along the resistor of potentiometer 34 at a constant rate of speed. Clutch 53 is energized for gripping by battery 56 and deenergized by switch 55. When clutch 53 is deenergized, spring 54 pulls contactor 42 to the end of potentiometer 34 connected to switch 33.

In series with terminals 16 and 17 are also D.-C. generator 46 and the input to D.-C. amplifier 45. The shaft 51 of generator 46 is connected to motor 47 which receives its power from the output of D.-C. amplifier 45. Amplifier 45 may alternatively consist of a converter (D.-C. to A.-C.) and an A.-C. amplifier which supplies voltage to an A.-C. motor replacing D.-C. motor 47.

Terminals 14 and 15 are connected to an apparatus identical in structure with that shown connected to terminals 16 and 17.

In operation, air mileage unit 10, D.-C. generator 11, converter 12, and compass 13 cooperate to produce at terminals 16 and 17 a voltage proportional to the speed of the aircraft through the air mass along one coordinate (for example in a north-south direction). By means of wind circuit 18, said voltage is added to a voltage proportional to the wind velocity along a north-south direction, an assumed wind velocity in a north-south direction having been set in circuit 18 by means of knob 25.

The voltage produced at terminals 16 and 17, as modified by circuit 18 and generator 46 is impressed on the input of amplifier 45 where it is amplified and applied to motor 47. Motor 47 rotates at a speed which is a function of the voltage supplied by amplifier 45 thus rotating generator 46 through shaft 51. Generator 46 is so connected that the voltage generated is of opposite polarity to the voltage applied to amplifier 45 and the amplitude is proportional to the speed of rotation.

The consequence of this connection is that motor 47 will rotate at the proper speed to produce the proper balancing voltage from generator 46 to be fed back in the control circuit to form a closed servo loop.

Shaft 51 also operates position indicator 52 which may be a conventional revolution counter calibrated to show the position of the aircraft in distance along a north-south axis.

Assuming the equilibrium initially exists in the circuit of amplifier 45, motor 47 and generator 46, if the voltage from converter 12 increases, the voltage applied to amplifier 45 will increase, making motor 47 revolve at a faster rate until the output from generator 46 increases in the opposite sense enough to establish equilibrium. The rotation of shaft 51 is thus caused to give an accurate indication of the voltage at terminals 16 and 17 as modified. Position indicator 52 integrates the rotations of shaft 51 and will therefore give an accurate indication of the aircraft position along the north-south axis.

To start operation, indicator 52 is placed at a particular reference value. After a short distance of travel, the true position of the aircraft may be known by observation of the terrain below, by observation of the display means of radio object detection apparatus, or by any other navigational means. If this observed position of the aircraft along the north-south coordinate differs from the position indicated by indicator 52, it is obvious that the assumption of said wind velocity along the north-south axis was erroneous. The position indicated by component 52 may be corrected by proper rotation of knob 37 which rotates generator 36 to produce a voltage, a portion of which is picked up by contactor 42 to add to, or subtract from the other voltages applied to amplifier 45. This addition or subtraction of the voltage results in the speeding up or slowing down of shaft 51 and in setting the indication given by position indicator 52 back or ahead as required.

If knob 37 is pushed in to engage knob 25 before the position correction on indicator 52 is made, shaft 30 will also be turned to correct the rate set by contactor 24 in circuit 18.

At the beginning of a transit of contactor 42 across potentiometer 34, position indicator 52 will have been set to indicate the actual position of the aircraft. It is obvious that the shorter the time interval which has elapsed since contactor 42 began its transit, the smaller proportion of the voltage generated by generator 36 will be picked up by contactor 42 and applied to amplifier 45. Thus, the shorter said time interval the more turns, at a certain speed, will be required by knob 37 to make a correction of a certain magnitude in the indication given by component 52 and the greater will be the correction made in wind circuit 18. In other words, if position indicator 52 indicates a certain error in a short time a relatively large correction must be made to wind circuit 18, whereas if the same error is indicated by component 52 after a longer period then a relatively smaller correction must be made in circuit 18.

Circuits 18 and 35 are so arranged that corrections of position indicated on component 52 may be made at any time during the transit of contactor 42 and result in the proper correction to circuit 18 if knobs 25 and 37 are rotated simultaneously. Since the voltage generated by generator 36 is proportional to its speed of rotation and since the correction applied to indicator 52 is proportional to the product of the voltage and its duration, the speed at which generator 36 is rotated is immaterial.

Immediately after the corrections by knobs 25 and 37 have been made, clutch 53 is momentarily deenergized by switch 55 allowing spring 54 to return contactor 42 to its original position. Contactor 42 is in a position to start another transit in preparation for a future correction. Opening switch 33 will permit correction of indicator position irrespective of the position of contactor 42.

The operation of the aided tracking circuit and position indicator connected to terminals 14 and 15 is similar to that described above but gives information along another set of coordinates, in the example given, along the east-west axis.

While the use of this invention has been explained with regard to navigation of an aircraft, it is obvious that this invention is equally useful in the navigation of a ship or in any ambulatory object.

While there has been described what is at present considered to be the preferred embodiment of this invention it will be obvious to those skilled in the art that various changes and modifications may be made therein without departing from the scope of the invention as set forth in the appended claims.

The invention claimed is:

1. In an aircraft, the combination comprising means for providing angular displacement proportional to airspeed, a voltage generator connected to said providing means for producing a voltage corresponding to the airspeed of said craft, a compass actuated drive, means for resolving said airspeed voltage into north-south and east-west coordinate voltage components, said resolving means being supplied from said generator and said drive, a craft position coordinate indicator, a normally balanced closed-loop feed-back circuit connected to receive one of said coordinate component voltages and to supply said indicator, a circuit for providing a voltage corresponding to an assumed wind component for addition to the corresponding coordinate component voltage, means for effecting an adjustment in said wind component voltage, means for providing a voltage connected to supply said close-loop circuit for effecting a desired correction in the indicated coordinate position on said indicator, means for effecting a simultaneous control of said adjustment effecting and said correction voltage providing means, means for controlling the magnitude of said correcting voltage in accordance with time elapsed from a given starting time, and means for resetting said last named means to a position corresponding to an initial value.

2. In an aircraft, the combination comprising means for providing a voltage proportional to airpseed, means receiving the output of said providing means for resolving said airspeed voltage into rectangular coordinate component voltages, means for adding a voltage proportional to a wind component to the corresponding one of said airspeed component voltages, a craft position coordinate indicator, means for translating and for applying to said indicator one of said airspeed components including said added corresponding wind component, means for effecting an adjustment in said wind component voltage, means for supplying a modifying voltage component to said translating means for effecting a correction of the position indicated on said indicator, means for effecting a simultaneous control of said adjustment effecting and said correction providing means, means controlling the magnitude of said position correcting component in accordance with time elapsed from a given starting time, and means for resetting said last named means to a position corresponding to an initial value.

References Cited in the file of this patent
UNITED STATES PATENTS

| Number | Name | Date |
|---|---|---|
| 1,376,453 | Meyer | May 3, 1921 |
| 2,105,985 | Papello | Jan. 18, 1938 |
| 2,382,994 | Holden | Aug. 21, 1945 |
| 2,403,152 | Roters | July 2, 1946 |
| 2,457,287 | Townes | Dec. 28, 1948 |
| 2,467,179 | Andresen | Apr. 12, 1949 |
| 2,480,208 | Alvarez | Aug. 30, 1949 |
| 2,538,226 | Anderson et al. | Jan. 16, 1951 |
| 2,553,529 | Dehmel | May 15, 1951 |

FOREIGN PATENTS

| 722,351 | France | Dec. 29, 1931 |